J. F. McREYNOLDS.
CORN KNIFE.
APPLICATION FILED SEPT. 23, 1912.
1,117,216. Patented Nov. 17, 1914.
FIG. 2
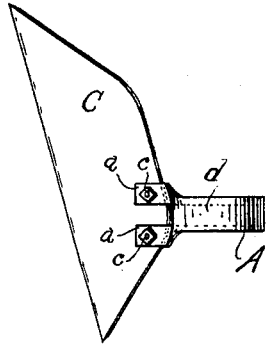
FIG. 1
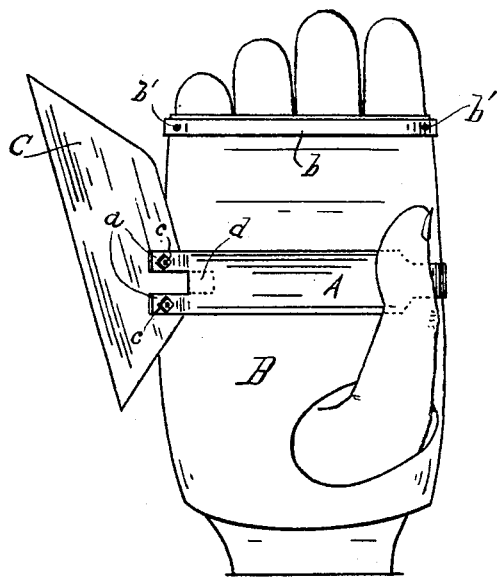
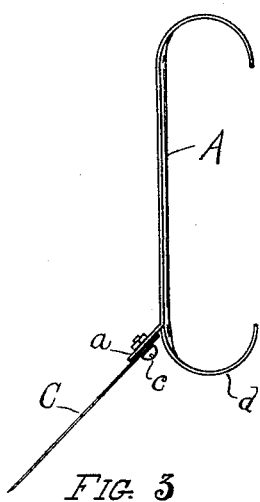
FIG. 3
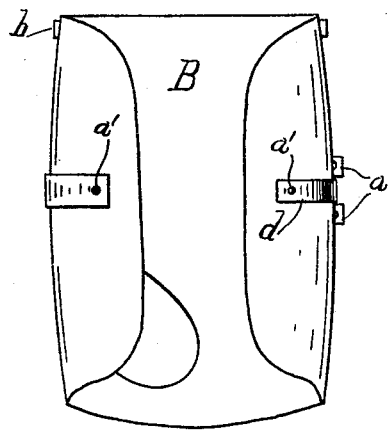
FIG. 4
WITNESSES:
G. C. Bernard
C. B. Bernard
INVENTOR
J. F. McREYNOLDS
BY
M. A. Crandall
ATTORNEY

UNITED STATES PATENT OFFICE.

JAMES F. McREYNOLDS, OF SIOUX CITY, IOWA.

CORN-KNIFE.

1,117,216.  Specification of Letters Patent.  Patented Nov. 17, 1914.

Application filed September 23, 1912. Serial No. 721,802.

*To all whom it may concern:*

Be it known tthat I, JAMES F. MC-REYNOLDS, a citizen of the United States, residing at Sioux City, in the county of Woodbury and State of Iowa, have invented new and useful Improvements in Corn-Knives, of which the following is a specification.

My invention relates to means for cutting corn stalks and the like, and the object of the invention is to provide a durable, simple and highly efficient device, by use of which the operator may cut and grasp the stalk with one hand.

The prior method of cutting corn for fodder and also for topping corn, by use of the well known corn knife, is very slow and impractical in as much as the operator must hold each stalk with one hand; or support it, together with the bundle of stalks being carried, with his arm, while the other arm wields the knife. This difficulty I have overcome, as by use of my device one is able to cut and grasp the stalk with one hand, with ease, leaving the other hand free to carry the load, as will presently be made more clear.

The construction and merits of my invention will be fully understood from the following description, reference being had to the accompanying drawings forming a part of this specification, in which like characters of reference designate corresponding parts throughout the several views, of which,—

Figure 1 is a front elevation of a device constructed in accordance with my invention, and as adjusted to the hand ready for use; Fig. 2 is a plan view of the same, with the mitt omitted; Fig. 3 is an end elevation of the same, with the mitt omitted; and Fig. 4 is an elevation of the back of the device, with the knife removed.

The handle A, constructed of any suitable material, preferably of sheet-metal, extends transversely of the palm of a mitt, or lining B, preferably of leather or other flexible material. In transverse section the handle is curved slightly to conform somewhat to the grip of the hand. One end of the handle is sheared for a short distance longitudinally, forming three end portions, the outer two being bent outwardly at an angle of approximately forty-five degrees from the handle, (Figs. 1 and 3) the middle portion *d* and the opposite end of the handle being curved around the sides of and to the back of the mitt to which they are secured as by rivets *a'*, (shown in Fig. 4).

A rib *b* extends transversely of and is secured to the end of the mitt by rivets *b'*, which serves to keep the mitt in correct shape and also conserves the life of the mitt.

The knife C, of any suitable shape and size, is removably secured to the shanks *a* by short bolts *c;* yet it may be permanently secured, as by rivets or other means.

As clearly illustrated, the blade depends from the handle at an angle of substantially forty-five degrees with the cutting edge declined from the heel forwardly.

In the practical operation of my device, the operator, if cutting stalks for fodder, strikes the stalk with the blade a sufficient blow to sever it, and coincident with the severing, grasps the stalk and conveys the same to the other arm and proceeds to the next stalk. In topping corn,—that is cutting the stalk above the ears,—the operator first grasps the stalk and by a downward turn of the wrist cuts it off.

I would not be understood as, being limited to, the specific structure herein illustrated and described, for, without departing from the spirit of my invention, it is apparent that the device may be constructed in divers forms.

Having thus described my invention, what I claim as new and desire to secure by United States Letters Patent, is,—

A device of the class described comprising, in combination, a blade and a hand engaging element secured thereto and so related as to be adapted to secure the blade to the hand at the side opposite the thumb with the edge of the blade directed outwardly from the longitudinal axis of the hand and inwardly from the palm, the plane of said blade making an angle of approximately 45 degrees with the plane of the palm of the hand and the blade extending forward a material distance from the point of attachment in a direction leading away from the wrist.

In witness whereof I have hereunto set my hand this fourteenth day of September, 1912, in the presence of two witnesses.

JAMES F. McREYNOLDS.

Witnesses:
W. C. LONG,
E. B. LYSTER.